UNITED STATES PATENT OFFICE.

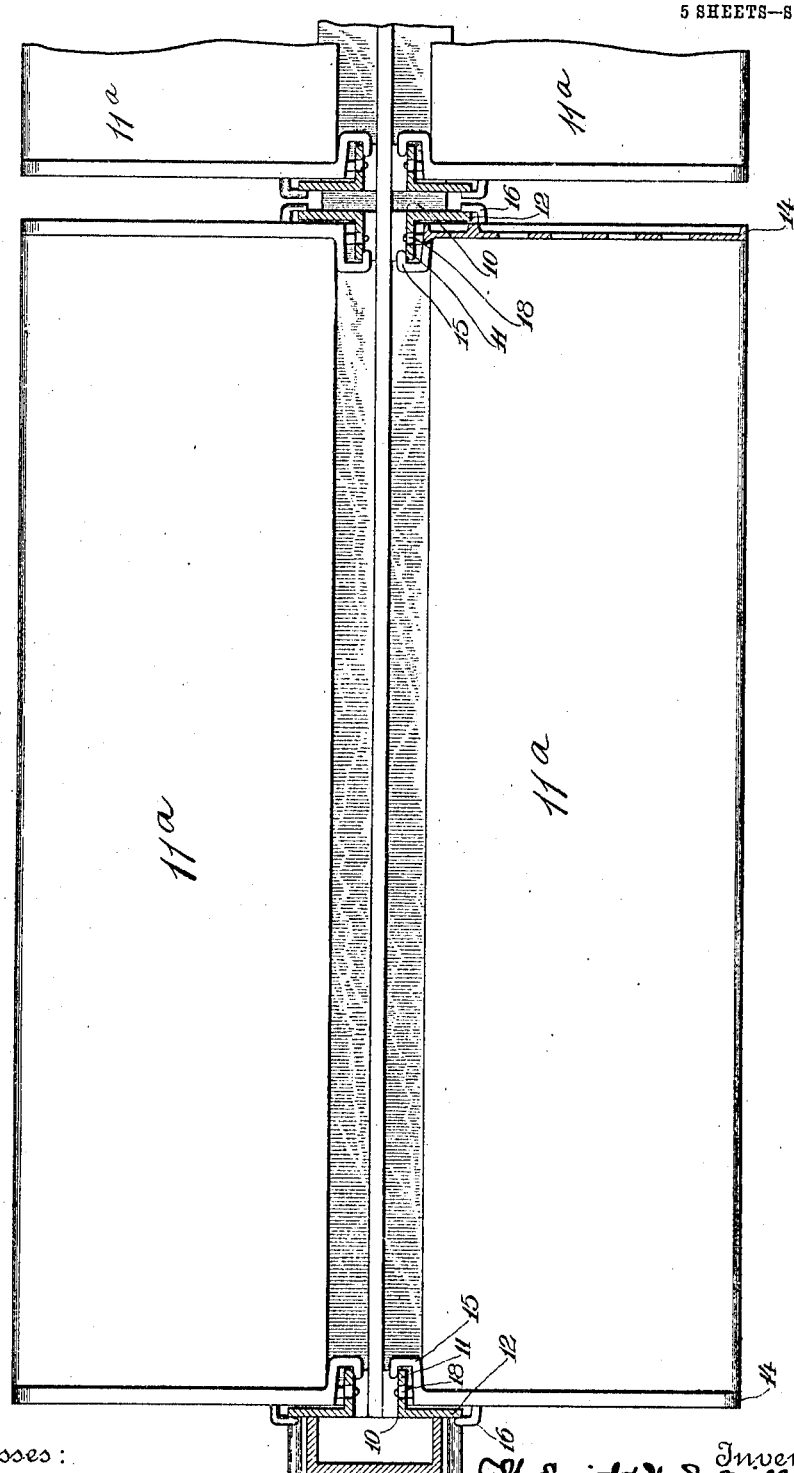

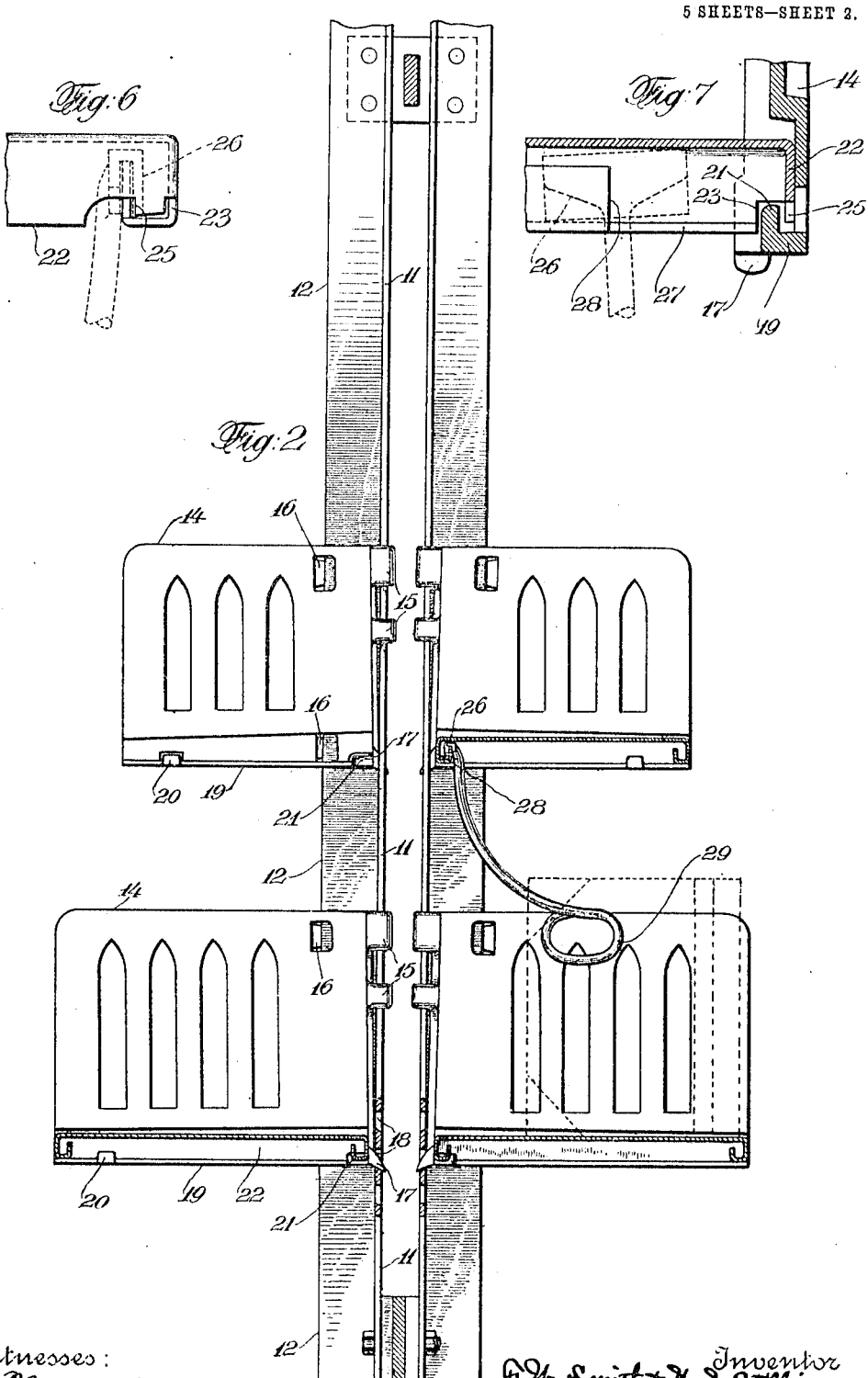

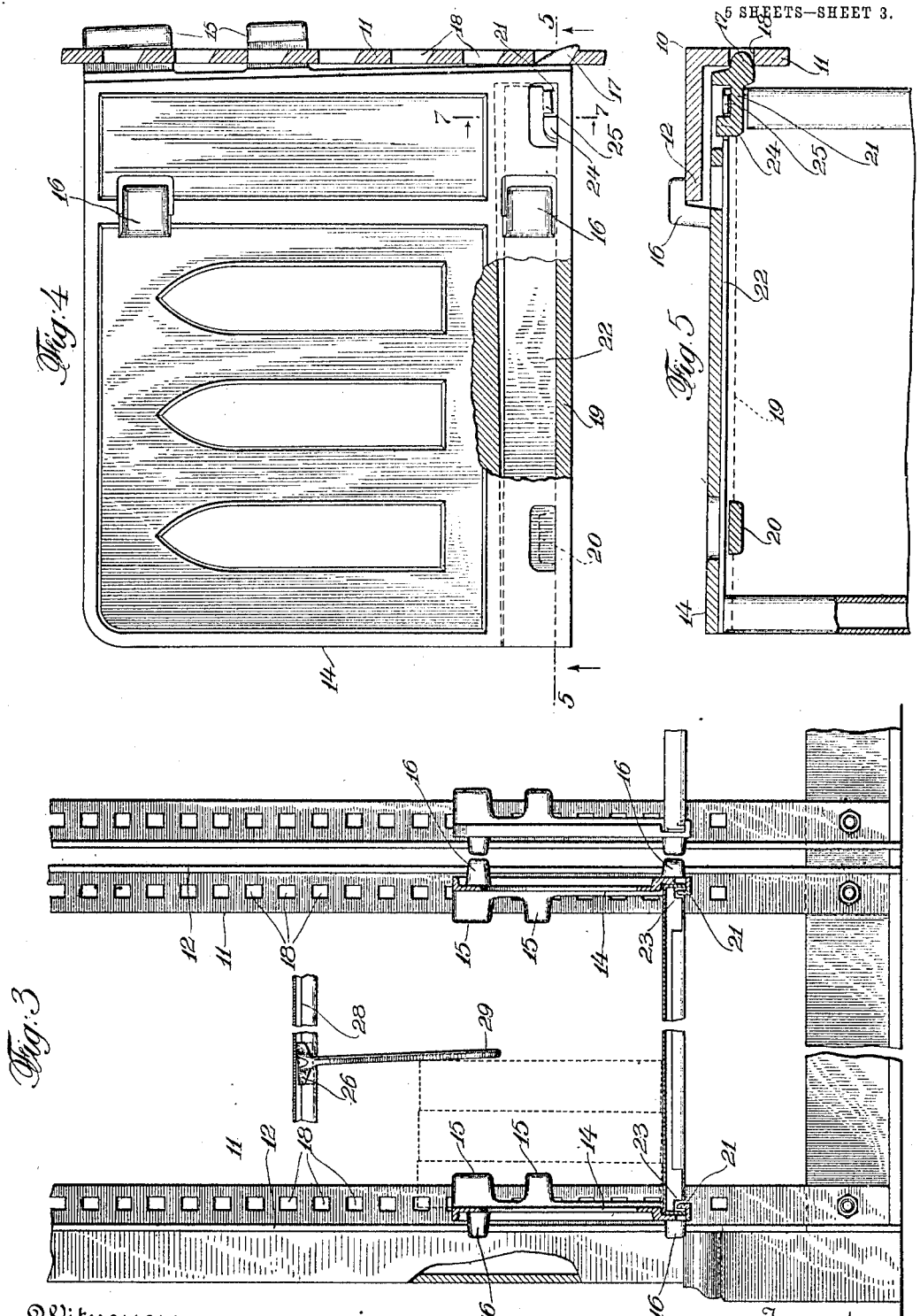

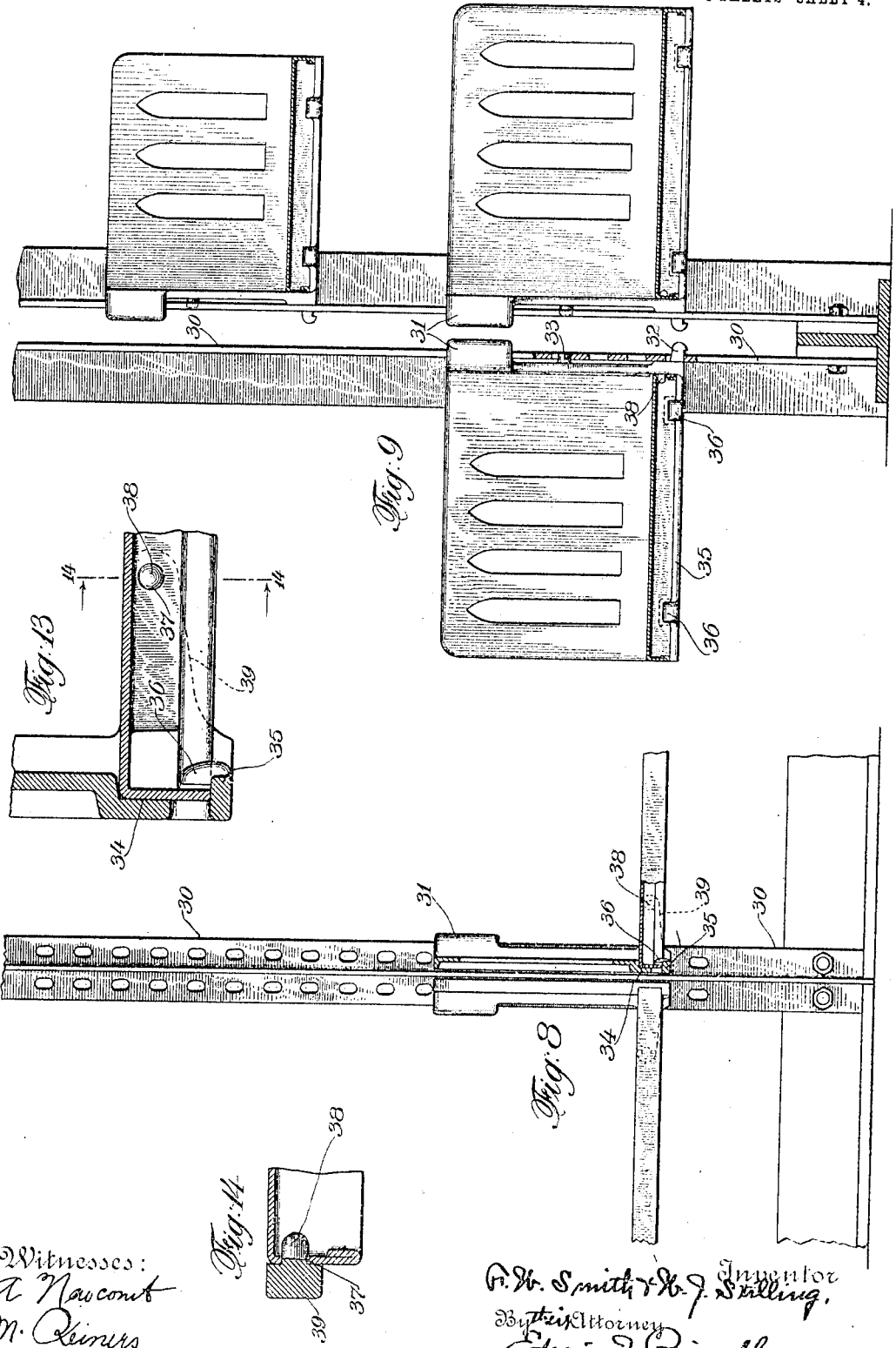

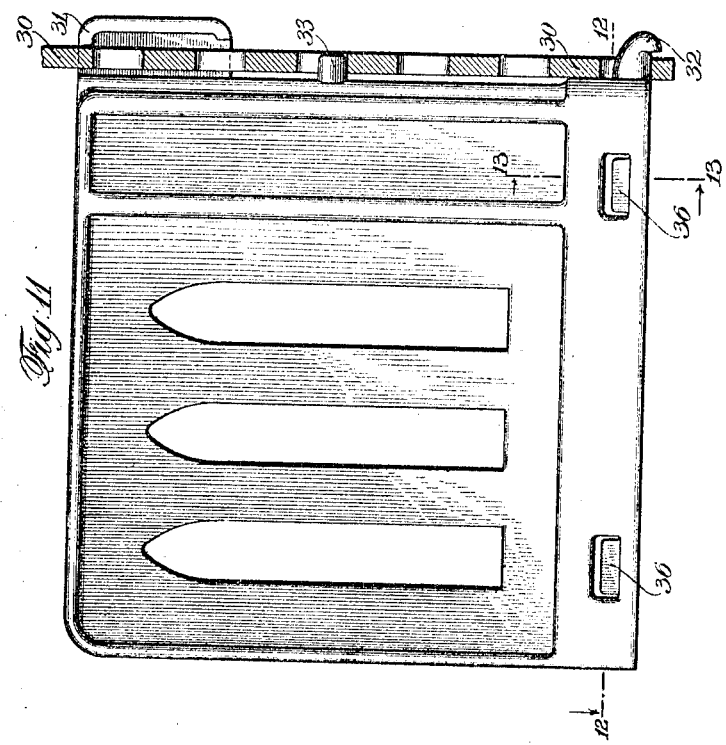
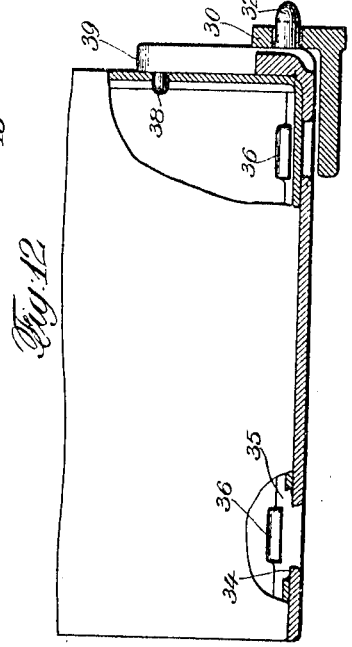
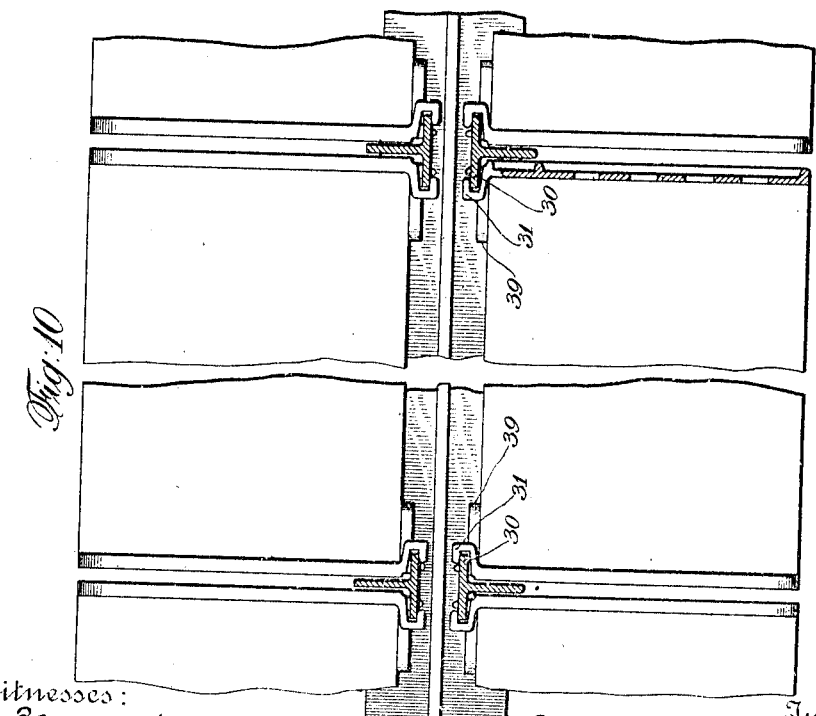

FREDERICK W. SMITH AND WILLIAM J. STILLING, OF BROOKLYN, NEW YORK, ASSIGNORS TO HECLA IRON WORKS, OF BROOKLYN, NEW YORK.

BOOK-STACK.

947,583.  Specification of Letters Patent.  Patented Jan. 25, 1910.

Application filed February 6, 1908. Serial No. 414,589.

*To all whom it may concern:*

Be it known that we, FREDERICK W. SMITH and WILLIAM J. STILLING, of Brooklyn, in the county of Kings and in the State of New York, have invented a certain new and useful Improvement in Book-Stacks, and do hereby declare that the following is a full, clear, and exact description thereof, reference being had to the accompanying drawings, in which—

Figure 1 is a horizontal sectional view of a book-stack embodying our invention; Fig. 2 is a vertical sectional view of the stack of Fig. 1; Fig. 3 is a front elevation partly broken away of the book-stack of Fig. 1; Fig. 4 is an enlarged side elevation of a bracket shelf and a portion of the upright which supports the bracket of the stack of Fig. 1; Fig. 5 is a horizontal sectional view taken on the line 5—5 of Fig. 4; Figs. 6 and 7 are detail views showing the manner of engagement of the book support with the shelf; Fig. 8 is a front elevation, partly in section, of another embodiment of our invention; Fig. 9 is a side view of Fig. 8; Fig. 10 is a horizontal sectional view on an enlarged scale of the stack of Fig. 8; Fig. 11 is an enlarged side elevation of a bracket shelf and upright of Fig. 8; Fig. 12 is a section on the line 12—12 of Fig. 11; Fig. 13 is a section on the line 13—13 of Fig. 11; and Fig. 14 is a section on the line 14—14 of Fig. 13.

The object of our invention has been to provide a book-stack having the advantages hereinafter specified, and to such ends our invention consists of the book-stack hereinafter specified.

Our invention is capable of embodiment in many different forms, and we will describe two of such embodiments.

In that embodiment of our invention which is the subject of Figs. 1 to 7, we provide uprights for supporting the shelves, which uprights preferably consist of angle irons 10, having one web 11 parallel to the shelf 11ᵃ and the other web 12 perpendicular to the shelf. These angle irons may be supported in any desired manner, and in the present embodiment of our invention there is a pair of angle irons for each series of shelves, the angle irons being arranged right and left so that their respective webs 11 project inward toward the shelves. Each
shelf is supported from its respective angle irons by a bracket at each end of the shelf. These brackets are adjustable up and down on the angle irons and are removable therefrom, and the brackets and shelf are so constructed that when the shelf is fastened to the brackets it prevents movement of the brackets in that direction which would permit them to be released from the angle irons; in other words, placing the shelf in question locks the brackets upon the angle irons but does not interfere with their adjustability up and down upon the angle irons. Each bracket consists of a plate-like body 14 having a pair of rearwardly projecting hooks 15 on one face of the plate, and having a pair of hooks 16 extending at right angles to the plate at its rear edge and near the upper portion of such edge. The hooks 15 are adapted to engage the rear web 11 of the angle irons. At or near the lower rear corner of the bracket is a lug 17 that is adapted to engage in one of a series of holes 18 formed in the rear web of the angle irons. The lower walls of the holes are preferably inclined downward and rearward to facilitate the escape of dust, and the lower surface of the said lug may have a corresponding inclination to cause a tendency of the lug to slide rearward, and thus to more securely maintain its engagement with the said holes. On the lower edge of the bracket is a horizontally projecting flange 19 for supporting the shelf, and the bracket is preferably recessed above the flange so that the end of the shelf fits into the face of the bracket. The flange 19 is provided with upwardly projecting lugs 20 and 21, over which the shelf is adapted to fit so as to hold the bracket in engagement with the end of the shelf and prevent the shelf from slipping off the flange. The shelf is preferably made of sheet metal, and the front and rear edges thereof are bent downward, inward and upward to form U-shaped braces along such edges. At the ends of the shelf the metal is bent down to form a simple flange 22. The U-shaped brace of the rear edge of the shelf is cut away at 23 to permit it to receive the lug 21, and such lug has formed on it a beveled hook 24 that is adapted to be engaged by a hook 25 formed at the rear end of the said flange of the shelf, so that when the shelf is completely engaged with the bracket, the said hooks will be in engagement and prevent the shelf from sliding forward on the bracket.

In the operation of the present form of our invention, the brackets, while held inclined away from each other in a forward direction, are placed with their hooks 16 in engagement with the forward flanges of the angle irons. The brackets are then swung toward each other, causing their hooks 15 to engage the rearward flanges of the angle irons, and the lugs 17 are then engaged with holes in the rear flanges of the angle irons at the level where it is desired to have the shelf stand. The rear corners of the shelf are then above the flanges at the bottoms of the brackets, and the shelf is moved rearward, its said flanges engaging the lugs 20, locking the brackets from movement away from each other. The shelf is pushed on rearward until its hook 25 rides over and engages the hook 24 on the lug 21 of each bracket, thus locking the shelf upon the brackets. The shelf cannot now be disengaged from the brackets without raising its rear edge so as to lift the hook 25 out of engagement with the hook 24 on the lug 21, and the brackets cannot be swung apart to disengage them from the angle irons, because they are held by the end flanges of the shelf. Thus the shelf is locked to the bracket, and the brackets are locked on the angle irons. Notwithstanding the parts are thus locked together, the brackets can be adjusted up and down on the angle irons by slightly raising the forward ends of the brackets until the lugs at their rear corners have been disengaged from the holes in the flanges 11, and then the shelf can be adjusted up or down to any desired point. Not only is this so, but we provide sufficient play between the brackets and the shelf so that either end of the shelf can be adjusted while the other is permitted to remain stationary. This makes it much easier to adjust a shelf of heavy books than would be the case if it were necessary to keep the shelf level and adjust both ends at the same time.

In book-stacks using the above-described embodiment of our invention, the angle irons of adjacent tiers of shelves need only to be separated by a sufficient space to permit the hooks 15 of one set of brackets to pass the corresponding hooks of the brackets of the next tier without striking.

In order to support books on the shelf when there is less than a whole row of books, we provide a book support consisting of a U-shaped head 26 that is adapted to be raised through an opening 27 beneath the shelf until it is in line with the flange 28 forming part of the stiffening along the rear edge of the shelf and the head then slipped along to embrace said flange. A shank 29 is formed on said head and extends down in position to bear against the side of the books. Our book support can readily be shifted along the said flange to any desired point, and then the tilting of the head, owing to the pressure of the books against the shank, will cause the head to cramp between the underside of the shelf and the upper edge of the said flange, and thus to be locked in the adjusted position.

It will be observed that the above-described embodiment of our invention has among others the following advantages: It is extremely simple. The only framework or uprights that are needed are the simple angle irons. These are cheap; they occupy but small space, and the whole construction affords little opportunity for the accumulation of dust or vermin. One shelf can be put in or taken out without interfering with those above or below. A shelf full of books can be adjusted up or down, either as a whole or one end at a time.

In that embodiment of our invention which is illustrated in Figs. 8 to 14, instead of a pair of angle irons between the ends of adjacent tiers of shelves, a single T-iron is used. Each side of the rear flange 30 of the iron is provided with a series of holes to support the shelves. The brackets are made right and left, and each bracket at the upper portion of the rear edge thereof has a hook 31 which is adapted to engage the adjacent rear flange of the T-iron. At the lower rear corner of the bracket is a rearwardly projecting hook 32 that is adapted to enter one of the holes in the T-iron, and that is preferably constructed to engage the rear face of the T-iron so as not only to prevent the bracket from downward movement, but to prevent its lower portion from being swung forward until it has been lifted. Between the said hooks, each bracket preferably has a lug 33 on its rear edge which is adapted to engage one of the vertical series of holes in the T-iron for the purpose of preventing the bracket from tipping over sidewise. The shelf is preferably formed of sheet metal and has downwardly extending flanges around its four edges. Each bracket has a recess 34 formed in the face adjacent to the shelf, and a ledge 35 upon which the edge of the shelf is supported, there being lugs 36 on the said ledge to prevent the shelf from slipping off the ledge, and to lock the bracket on the shelf. The rear lugs 36 are so positioned that the shelf can have a limited forward and backward movement on the bracket without striking said lugs. This movement is for the purpose of enabling holes 37 in the rear flange of the shelf to be engaged with pins 38 carried by inwardly projecting arms 39 on the brackets. The engagement of the said pins with the shelf further tends to prevent the brackets from tipping laterally toward each other.

In the operation of that form of our invention just described, the brackets are engaged with the edge of the shelf by tipping the brackets outward until the upper walls of their recesses are sufficiently out of the way to permit the shelf to be set down on the ledges and over the lugs 36. The shelf is set at the forward limit of its movement on the brackets. The brackets are then tipped toward each other until the upper hooks can pass the rear flanges on the T-irons, when the brackets are swung to a vertical position, and moved rearward, thus engaging the said hooks with the flanges. The shelf is then pushed rearward until it engages the pins on the arms of the brackets, and thus the shelf and brackets are locked together so that movement relative to each other is prevented. The shelf and brackets can now be adjusted up and down the T-irons to any desired position by swinging the lower ends of the brackets outward until the lower hooks and the pins 38 on the brackets are disengaged from their respective holes. The brackets can then be slipped up or down on the T-irons until the desired level is reached when the shelf will be put in locked position by swinging the lower ends of the brackets toward the T-irons and engaging their lower hooks with holes in the T-iron flange, and their pins 38 with other of said holes.

We claim:—

1. In a book stack, the combination of vertical supports, brackets adapted to engage said supports by movement about a vertical axis, a shelf having means at the rear thereof for engaging said brackets by a movement to the rear to prevent the withdrawal thereof, the means for engaging said brackets upon said supports being operable for disengagement in a direction transverse to the rearward movement of the shelf.

2. In a book-stack, the combination of vertical supports, brackets adapted to engage said supports by movement about an axis, a shelf having means for engagement with said brackets by a rearward movement, a beveled lug formed on each of said brackets, and a beveled hook formed on each shelf, said lug and hook being so positioned that the hook will ride over and engage the lug at the completion of the rearward movement of the shelf.

3. In a book-stack, the combination of vertical supports having forwardly and laterally projecting flanges, plate-like brackets having upper and lower hooks adapted to engage said forwardly projecting flanges, and having laterally projecting hooks on the upper parts of the brackets adapted to engage said laterally projecting flanges, said last-mentioned flanges having a vertical series of holes, and said brackets having lugs at their lower rear corners to engage said holes.

4. In a book-stack, the combination of vertical supports having forwardly and laterally projecting flanges, plate-like brackets having upper and lower hooks adapted to engage said forwardly projecting flanges, and having laterally projecting hooks on the upper parts of the brackets adapted to engage said laterally projecting flanges, said last-mentioned flanges having a vertical series of holes, said brackets having lugs at their lower rear corners to engage said holes, and a shelf having downwardly projecting flanges at the ends adapted to engage upwardly projecting lugs on said brackets.

5. In a book-stack, the combination of vertical supports having forwardly and laterally projecting flanges, plate-like brackets having upper and lower hooks adapted to engage said forwardly projecting flanges, and having laterally projecting hooks on the upper parts of the brackets adapted to engage said laterally projecting flanges, said last-mentioned flanges having a vertical series of holes, said brackets having lugs at their lower rear corners to engage said holes, and a shelf having downwardly projecting flanges at the ends adapted to engage upwardly projecting lugs on said brackets, said brackets having recesses to receive the ends of said shelves.

6. In a book-stack, the combination of vertical supports having forwardly and laterally projecting flanges, plate-like brackets having upper and lower hooks adapted to engage said forwardly projecting flanges, and having laterally projecting hooks on the upper parts of the brackets adapted to engage said laterally projecting flanges, said last-mentioned flanges having a vertical series of holes, said brackets having lugs at their lower rear corners to engage said holes, a shelf having downwardly projecting flanges at the ends adapted to engage upwardly projecting lugs on said brackets, and beveled lugs formed on said brackets and beveled hooks formed on said shelves to lock said shelves on said brackets.

7. In a book-stack, the combination of angle irons arranged right and left, the rear flanges of said angle irons being provided with a vertical series of holes, plate-like brackets each of which has upper and lower hooks adapted to engage the forwardly projecting flanges of the angle irons and laterally projecting hooks adapted to engage the laterally projecting flanges of the angle irons, and a shelf having downwardly projecting end flanges, said brackets having recesses adapted to receive the ends of said shelf and ledges upon which said ends are adapted to rest, said ledges having upwardly projecting lugs to engage the flanges of said shelf.

8. In a book-stack, the combination of angle irons arranged right and left, the rear flanges of said angle irons being provided with a vertical series of holes, plate-like brackets, each of which has upper and lower hooks adapted to engage the forwardly projecting flanges of the angle irons and laterally projecting hooks adapted to engage the laterally projecting flanges of the angle irons, and a shelf having downwardly projecting end flanges, said brackets having recesses adapted to receive the ends of said shelf and ledges upon which said ends are adapted to rest, said ledges having upwardly projecting lugs to engage the flanges of said shelf, said brackets having beveled lugs and said shelves having beveled hooks that are adapted to be engaged to lock said parts together.

9. In a book-stack, the combination of a series of tiers of shelves, right and left angle irons adapted to support each of said tiers of shelves, the angle irons of adjacent tiers being spaced apart, brackets having hooks adapted to engage both of the flanges of said angle irons, and means for adjustably supporting said brackets on said angle irons.

10. In a book-stack, the combination of vertical supports having forwardly and laterally projecting flanges, plate-like brackets having lugs adapted to engage both said forwardly and laterally projecting flanges by movement about a vertical axis, and a shelf supported by the brackets.

In testimony that we claim the foregoing we have hereunto set our hands.

FREDERICK W. SMITH.
WILLIAM J. STILLING.

Witnesses:
WILLIAM A. O'CONNOR,
ALBERT E. WERT.